United States Patent

Vary

[15] 3,643,569

[45] Feb. 22, 1972

[54] COLOR RESTORATION OF UNILAYER AND DUOLAYER COLOR PHOTOGRAPHIC ELEMENTS

[72] Inventor: Williard E. Vary, 4734 Bromley Avenue, Bradbury Park, Md. 20023

[22] Filed: May 25, 1970

[21] Appl. No.: 40,400

[52] U.S. Cl. ..................................................95/12.2, 96/2
[51] Int. Cl. .....................................................G03b 33/00
[58] Field of Search ......................355/32, 88; 96/2; 95/12.2

[56] References Cited

UNITED STATES PATENTS 3,529,519  9/1970  Mitchell ..............................355/32 X

OTHER PUBLICATIONS

The Encyclopedia of Photography, Vol. 5, pgs. 809–811 and 817–820 and 822–824 and 828; 1963.

*Primary Examiner*—Samuel S. Matthews
*Assistant Examiner*—Richard M. Sheer
*Attorney*—R. S. Sciascia, Arthur L. Branning and James G. Murray

[57] ABSTRACT

Full or partial color is restored to unilayer or duolayer emulsion films which have been sensitized to only one primary color per layer by adding the required subtractive primary color(s) to the viewing, projection, or printing illumination means.

13 Claims, No Drawings

3,643,569

COLOR RESTORATION OF UNILAYER AND DUOLAYER COLOR PHOTOGRAPHIC ELEMENTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a method for restoring full or partial color to films which have been sensitized to only one or two of the primary colors. More particularly, this invention is related to techniques for restoring primary colors to the unilayer and duolayer color photographic films disclosed in Ser. No. 40,015, filed May 25, 1970 which is hereby incorporated by reference.

All color photography has been based on the assumption that any visible color can be matched by adding together red, green and blue light in suitable proportions. These are known as additive primary colors.

The earliest color films made use of the additive principle. One of the best known was Dufaycolor where the image was formed by exposing a black-and-white panchromatic emulsion through a mosaic of minute red, green, and blue filters, side by side, and the exposed film processed to a positive transparency. When this was viewed by transmitted light, the amount of light passing through each filter element was controlled by the density of silver deposited in the emulsion. Since the eye could not resolve the individual elements of the mosaic, the resultant effect was that the red, green and blue light added together in different proportions to form the colors of the original scene. Another well known film was the first Kodacolor made by Eastman Kodak Co. The image was formed by exposing a black-and-white panchromatic emulsion where the emulsion was embossed with ridges to form a "lenticular" surface. Exposure was made through a tricolor filter (red, blue and green) over the camera lens. The emulsion was processed to a positive transparency, and, when viewed by transmitted light through a tricolor filter the transmitted light passing through the lenticular embossed emulsion was controlled by the density of the silver deposited in the emulsion. The result was that the red, green and blue added together to form the color of the original scene.

Modern color films make use of the subtractive primary colors. Any color can be formed by subtracting from a beam of white light a proportion of each of the additive primaries so that what remains is the required color. The actual dyes that subtract red, green and blue from white light are their complementary colors: cyan, magenta and yellow.

Each dye absorbs only one of the primary colors and transmits the other two:

| Dye | Absorbed | Transmitted |
| --- | --- | --- |
| Cyan | Red | Blue, green |
| Magenta | Green | Blue, red |
| Yellow | Blue | Green, red |

Thus, red is produced by magenta overlaid by yellow; green is produced by cyan overlaid by yellow; and, blue is produced by cyan overlaid by magenta.

Present day color films consist of three emulsion layers; the top layer is sensitive to blue light only; the middle layer is sensitive to blue and green light; and, the bottom layer is sensitive to blue and red light. To prevent blue light from exposing all three layers, a yellow filter is coated on top of the middle (green sensitive) layer.

Dyed gelatin filters are used in color printing of three-layer color emulsions to adjust the color balance of the emulsion being used. This is required as color emulsions vary from one emulsion batch to another. The filters exist in cyan, magenta and yellow in low saturation (density) and are referred to as 0.01 cyan, 0.05 magenta, etc. These filters transmit freely on the long wavelength side of the absorption peak but absorb to some extent at all wavelengths shorter than the absorption peak. Therefore, the cyan and magenta filters have high secondary absorptions leading to faulty color reproduction. Therefore, these filters will not be satisfactory for use in color restoration.

With modern day three-layer color emulsions, it is practically impossible to record only one primary color in any pure form. To attempt it, would require two filters over the camera lens, and, because of the filter factors (photographic densities) of those two filters, the exposure would have to be unduly increased. In processing, excessive dyes, complementary to the two colors withheld (absorbed) by the filters, would be deposited in the unexposed emulsion layers. And, in attempting to record only two primary colors on a three-layer color emulsion, one filter would be required over the camera lens to absorb the third color. Again, in processing, a concentration of dye complementary to the color filtered out, will be deposited in the unexposed emulsion layer. These concentrations of dyes are excessive and unwanted and serve no useful purpose. They also preclude the recording of only one, or two primary colors in any pure form. This also precludes restoration of partial and full color to one color or two color imagery.

SUMMARY OF THE INVENTION

Since, for the first time, unilayer and duolayer color emulsions as described in Ser. No. 40,015, filed May 25, 1970 made possible the recording of primary colors in their purest form without interference from unwanted colors, this invention makes possible the full or partial restoration of color to these emulsions while retaining their clarity and purity. This is accomplished by adding back the subtractive primary colors which were omitted in the films by using suitable color mediums over various illumination means, such as viewers, slide projectors, or picture-printing means.

STATEMENT OF THE OBJECTS OF THE INVENTION

It is an object of this invention to restore full or partial color characteristics to unilayer and duolayer emulsion color photographic elements without adversely affecting the high resolution of such films.

It is also an object of this invention to restore colors in their purest form to unilayer or duolayer emulsion color photographic films.

It is a further object of this invention to provide the required color medium for restoring colors to unilayer and duolayer emulsion color photographs.

It is an additional object of this invention to provide methods for restoring colors to unilayer and duolayer emulsion color photographs.

Other objects, advantages and novel features of the invention will become apparent from the following detailed description of the invention.

DESCRIPTION OF THE PREFERRED EMBODIMENTS

A unilayer color emulsion, by definition, has only one light-sensitive emulsion layer and that layer is sensitized to only one of the additive primary colors; namely, red, green or blue. The unilayer color emulsion will thus record only the one primary color to which it is sensitized and will be missing the other two primary colors. The additive primary color will be recorded as a subtractive primary color in the sensitized emulsion layer as shown below:

| Sensitized layer | Image color |
| --- | --- |
| Blue | Yellow |
| Green | Magenta |
| Red | Cyan |

A duolayer color emulsion, by definition, has only two light-sensitive emulsion layers and those layers are sensitized to only two of the additive primary colors; namely, blue and green; blue and red; and, green and red. The duolayer color emulsion will record only the two primary colors to which it is sensitized and will be missing the other primary color. The additive primary colors will be recorded as subtractive primary colors in the sensitized emulsion layers as shown below:

| Sensitized layers | Image color combination |
| --- | --- |
| Blue and green | yellow and magenta |
| Blue and red | yellow and cyan |
| Green and red | magenta and cyan |

The above image colors for unilayer and duolayer color emulsions are cited for emulsions processed to photographic images.

My invention to restore full color to unilayer and duolayer color emulsions applies to the exposed and processed emulsions whether on a flexible transparent base (film), opaque base (print), or rigid transparent base (such as glass or thick plastic) and whether processed to a negative or positive transparency.

The method employed is to add the subtractive primary color(s) of the additive primary color(s) that are not included in the original sensitized emulsion(s). This is accomplished by adding the required subtractive primary color(s) to any of the illumination means commonly used in the art such as viewing, projection or printing means.

The subtractive primary colors to be added to the unilayer and duolayer color emulsions to restore each to full color are as follows:

Unilayer color emulsions

| Sensitized layer | Image color | For full color, add |
| --- | --- | --- |
| Blue | Yellow | Magenta and cyan |
| Green | Magenta | Yellow and cyan |
| Red | Cyan | Yellow and magenta |

Duolayer color emulsions

| Sensitized layers | Image colors | For full color, add |
| --- | --- | --- |
| Blue and green | yellow and magenta | cyan |
| Blue and red | yellow and cyan | magenta |
| Green and red | Magenta and cyan | yellow |

The subtractive primary color(s) may be added in the form of colored mediums that transmit light and which will add only the color(s) required to restore full color to any of the unilayer and duolayer color emulsions without deteriorating the resolution and contrast of the initially recorded images. Examples of colored mediums adaptable for use in this invention are the various types of light filters commonly used in optical and photographic work. The term filter, however, is actually a misnomer with respect to this invention because here colors are being added to an image; not removed or screened therefrom. The appropriate colored medium may be interposed between the illumination means and photographic image or between the image and whatever viewing surface or background is used.

The restoration colors have, up to this point, been referred to as cyan, magenta and yellow subtractive primary colors. It may be desirable to establish a nomenclature that is in fact more truly descriptive. The new restoration colors, with their direct correlation to the unilayer and duolayer color emulsions will be known as:

| Nomenclature | Color |
| --- | --- |
| Minus blue | yellow |
| Minus green | magenta |
| Minus red | cyan |

Thus, the correlation to these emulsions is thoroughly established; for example, a duolayer emulsion sensitive to green and red is named "minus blue" and the subtractive primary color to be added to this emulsion by the color restoration medium is yellow, or, "minus blue." Thus, a unilayer emulsion that is sensitive to blue only and is termed to be "minus green and minus red" will require the subtractive primary colors magenta and cyan to be added for full color restoration. This would require the "minus green" and "minus red" colored mediums.

Each processed image on a unilayer and duolayer color emulsion will require a certain saturation of the subtractive primary color to be added in order to restore it to full color. This degree of saturation can change with exposure, processing and between emulsion batches of the same type of emulsion. To provide the latitude necessary to overcome these problems most efficiently, the colored medium should be variable in saturation, rather than of one low saturation value which would normally require a color filter pack of several of the low saturation units to acquire the needed saturation value.

The colored medium may be dyed gelatin, stained or dyed glass or plastic or other suitable material. They may be in any of the forms and apparatus well known in the art such as semicircular, circular, wedge or flat. In any form, the colored medium should provide from minimum to maximum saturation of a particular subtractive primary color so that a discrete saturation is possible for a particular need.

The colored medium should also be capable of being manipulated for the desired amount of color to be added. This may be accomplished manually, electrically or electronically. If two colored filters are used, as in full color restoration to unilayer color emulsions, the filters should be capable of being manipulated together or singly in order to achieve the addition of the correct amount of each subtractive primary color.

Obviously many modifications and variations of the present invention are possible in light of the above teachings. It is therefore to be understood that within the scope of the appended claims the invention may be practiced otherwise than as specifically described.

I claim:

1. A method of providing a color photographic image containing the three primary colors from a color photographic light-sensitive material missing sensitivity to two of the three primary colors comprising:
    exposing said color photographic material to light from an object to be recorded;
    processing said material to a color photographic image; and
    adding the subtractive primary colors of said missing primary colors to said image.

2. The method recited in claim 1, wherein the missing primary colors are green and red, and the subtractive primary colors added are magenta and cyan.

3. The method recited in claim 1, wherein the missing primary colors are red and blue, and the subtractive primary colors added are cyan and yellow.

4. The method recited in claim 1, wherein the missing primary colors are green and blue, and the subtractive primary colors added are magenta and yellow.

5. The method recited in claim 1, wherein partial color is restored to said color photographic image by adding the subtractive primary color of a single missing primary color to said image.

6. A method of providing a color photographic image containing the three primary colors from a color photographic light-sensitive material missing sensitivity to one of the three primary colors comprising:
    exposing said color photographic material to light from an object to be recorded;
    processing said material to a color photographic image; and adding the subtractive primary color of said missing primary color to said image.

7. The method recited in claim 6, wherein the missing primary color is red and the subtractive primary color added is cyan.

8. The method recited in claim 6, wherein the missing primary color is green and the subtractive primary color added is magenta.

9. The method recited in claim 6, wherein the missing primary color is blue and the subtractive primary color added is yellow.

10. A method of producing a color photographic image containing the three primary colors from a unilayer color photographic light-sensitive element having a single emulsion layer sensitized to one of the three primary colors comprising:
   exposing said photographic element to light from the object to be recorded;
   processing said element to a color photographic image;
   positioning said image in a viewing relationship with illumination means; and
   interposing a medium colored with the subtractive primary colors of the missing primary colors of said sensitized emulsion between said illumination means and said image.

11. The method recited in claim 10, wherein said photographic image is projected upon a viewing surface and said medium is interposed between said image and said viewing surface.

12. A method of producing a color photographic image containing the three primary colors from a duolayer color photographic light-sensitive element having two emulsion layers sensitized to two of the three primary colors comprising:
   exposing said photographic element to light from an object to be recorded;
   processing said element to a color photographic image;
   positioning said image in a viewing relationship with illumination means; and
   interposing a medium colored with the subtractive primary color of the missing primary color of said sensitized emulsions between said illumination means and said image.

13. The method recited in claim 12, wherein said photographic image is projected upon a viewing surface and said medium is interposed between said image and said viewing surface.

* * * * *

PO-1050
(5/69)

UNITED STATES PATENT OFFICE
CERTIFICATE OF CORRECTION

Patent No. __3,643,569__   Dated __February 22, 1972__

Inventor(s) __Willard E. Vary__

It is certified that error appears in the above-identified patent and that said Letters Patent are hereby corrected as shown below:

On the cover sheet after the word "Inventor" please delete "Williard" and replace it by -- Willard --.

Signed and sealed this 17th day of October 1972.

(SEAL)
Attest:

EDWARD M. FLETCHER, JR.
Attesting Officer

ROBERT GOTTSCHALK
Commissioner of Patents